July 2, 1935. C. L. EKSERGIAN 2,006,387
HYDRAULIC BRAKE
Filed Jan. 27, 1931
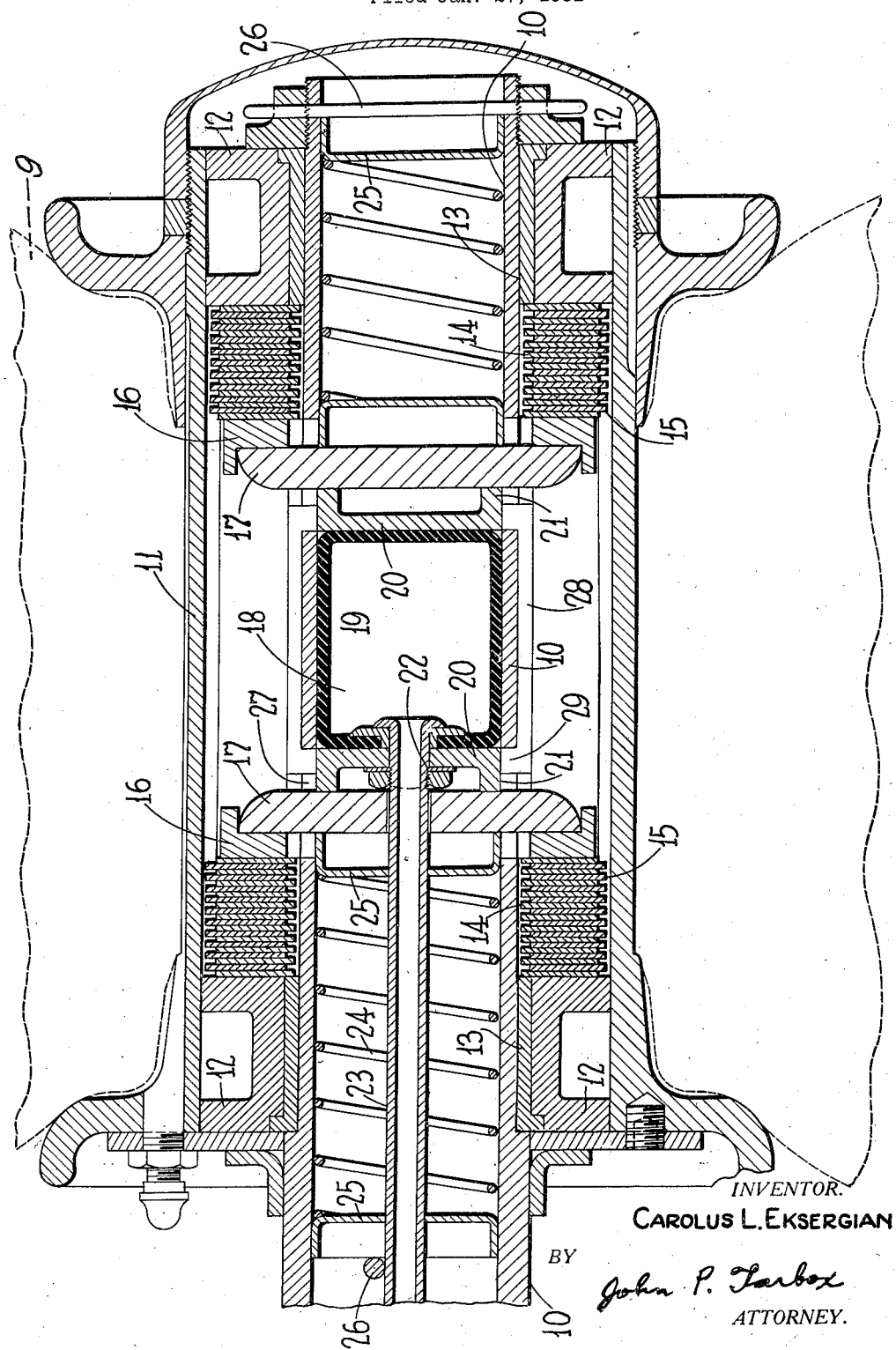
INVENTOR.
CAROLUS L. EKSERGIAN
BY John P. Tarbox
ATTORNEY.

Patented July 2, 1935

2,006,387

UNITED STATES PATENT OFFICE 2,006,387

HYDRAULIC BRAKE

Carolus L. Eksergian, Detroit, Mich., assignor to Budd Wheel Company, Philadelphia, Pa., a corporation of Pennsylvania Application January 27, 1931, Serial No. 511,482

3 Claims. (Cl. 188—18)

My invention relates to the art of vehicle brakes and is especially, though not exclusively adapted to vehicle wheels in which the tire is mounted directly upon the hub. This type of wheel has recently become very popular as an airplane wheel.

The braking of these wheels presents a difficult problem due to the small space afforded within the peripheral walls. It has therefore been an object of my invention to provide a brake for a wheel of this character involving a compact and simple arrangement of the parts, providing a large braking surface, the brake being economical to manufacture and effective in operation.

It has been a further object of my invention to provide a simple hydraulically operated brake of this character in which the hydraulic servomotor is mounted directly within a hollow axle and connected with the friction braking means in a very simple and adequate fashion.

Other objects and advantages of my invention will be obvious from a reading of the sub-joined specification in the light of the attached drawing, in which, The single figure is a central axial sectional view through my improved wheel and brake.

Referring to the drawing by reference characters, the numeral 10 indicates a hollow axle about which a suitable rim 11 is adapted to rotate, the rim and axle being interconnected by suitable supports 12 and bearings 13. The wheel disclosed for the purposes of illustration is of the type having no appreciable wheel body, the tire 9 being mounted about the annulus 11 which is of small circumference and constitutes, in effect, a combined hub and rim.

The friction members of my improved brake are in the nature of discs 14 and 15 which are respectively keyed to the axle and rim through splined portions of these members coacting with slots formed in the inner circumferences of the discs 14 and the outer circumferences of the discs 15, respectively. These braking discs are arranged in two axially spaced groups upon opposite sides of the center line of the wheel.

The discs are confined between annular pressure plates 16 on the one hand and the supports 12 on the other. Pressure bars 17 are received within recesses in the pressure plates and pass through suitable elongated slots 27 in the axle, these pressure bars being guided in their applying movements by the slots 27.

These braking members are urged into braking position by means of a suitable servomotor 18. This servomotor consists, in the present case, of an elastic rubber bag actuator 19 adapted to be expanded by means of a fluid pressure medium such as normally used in hydraulic brakes. Interposed between the rubber bag 19 and the pressure bars 17 are a pair of annular heads 20 which telescope within the axle and are slidable with respect thereto to urge the pressure bars, pressure plates and discs into braking position. These heads 20 are provided with annular flanges 21 abutting the central faces of the plates 16.

The rubber bag 19 and the inner head 20 are secured through a suitable pipe connection 22 to a pipe 23 through which the actuating fluid is admitted to the servomotor. The brakes are normally held in released condition by means of springs 24 coacting with suitable spring retainers 25 abutting fixed stops 26 secured to the axle on the one hand and the pressure bars 17 on the other. A suitable split sleeve 28 is secured about the central portion of the axle and is provided with flanges 29 adapted to serve as inner limiting stops to restrict the inward movement of the pressure bars 17.

It will be seen that I have devised a simple and effective hydraulic brake for this type of wheel in which the fluid pressure servomotor is mounted directly within the hollow axle of the wheel, and in which a large braking surface is obtained within a small space.

Modifications will be obvious to those skilled in the art and I do not therefore wish to be limited except by the terms of my sub-joined claims as interpreted in the light of the generic spirit of my invention.

What I claim is:

1. A vehicle wheel including in combination, a tire bearing hub member, an axle member, dual braking surfaces rotatable with said hub member, dual braking surfaces fixed with said axle member, fluid pressure actuating means located interiorly of said hub member centrally of said dual braking surfaces for effecting a coaction between said braking surfaces to retard the rotation of said hub member.

2. A vehicle brake comprising in combination, a unitary rotatable rim and hub member, a braking surface interiorly thereof in secured relation thereto, and comprising portions on either side of the central plane of said member, a hollow axle member interiorly of said hub member bearing cooperative braking surfaces, and means interiorly of said axle and hub members arranged centrally of said braking surfaces comprising a fluid pressure actuator to decelerate said combined hub and rim member.

3. A vehicle wheel including, in combination, a tire-bearing hub member, a hollow axle member, duel sets of braking surfaces, each of which includes surfaces interiorly of, and rotatable with, said hub member and surfaces exteriorly of, and fixed to, said axle member, yieldable members cooperating with said sets, fluid-pressure-actuated means interiorly of said axle member located centrally of said dual sets and yieldable members, and means cooperating with said actuating means and said braking surfaces whereby coaction between said surfaces is effected and whereby said rim member is retarded, and means yieldably urging said actuated means to inactive unactuated position.

CAROLUS L. EKSERGIAN.